United States Patent [19]

Dunlap et al.

[11] Patent Number: 5,066,445

[45] Date of Patent: Nov. 19, 1991

[54] RECOVERY AND MELT EXTRUSION OF AROMATIC/ALIPHATIC COPOLYAMIDES FROM LACTAM-PLASTICIZED POLYMER

[75] Inventors: Beth E. Dunlap; Fulton F. Rogers, Jr., both of Richmond, Va.; Mark F. Teasley, Wilmington, Del.

[73] Assignee: E. I. Du Pont de Nemours and Company, Wilmington, Del.

[21] Appl. No.: 508,862

[22] Filed: Apr. 12, 1990

[51] Int. Cl.$^5$ ............................................. B29B 9/12
[52] U.S. Cl. .............................. 264/176.1; 264/184; 264/211; 264/233; 264/331.12; 264/331.19; 528/310; 528/324
[58] Field of Search ............... 264/176.1, 78, 85, 211, 264/210.8, 9, 140–141, 184, 233, 331.12, 331.19; 528/310, 324

[56] References Cited

U.S. PATENT DOCUMENTS

| | | | |
|---|---|---|---|
| 2,374,069 | 4/1945 | Balthis | 264/211 |
| 2,419,277 | 4/1947 | Moncrieff et al. | 264/211 |
| 2,687,552 | 8/1954 | Gabler | 264/85 |
| 2,719,776 | 10/1955 | Kümmel | 264/85 |
| 3,006,899 | 10/1961 | Hill et al. | 264/210.8 |
| 3,296,216 | 1/1967 | Snooks, Jr. | 264/78 |
| 3,579,414 | 5/1971 | Ueda et al. | 264/210.8 |
| 3,994,990 | 11/1976 | Foote | 264/176.1 |
| 4,007,247 | 2/1977 | Ballard et al. | 264/140 |
| 4,842,797 | 6/1989 | Matsumura et al. | 264/210.8 |

FOREIGN PATENT DOCUMENTS 45-19714  7/1970  Japan.

Primary Examiner—Jeffery Thurlow

[57] ABSTRACT

Aromatic/Aliphatic copolyamides are recovered from lactam-plasticized polymer then melted and extruded to form shaped structures.

6 Claims, No Drawings

RECOVERY AND MELT EXTRUSION OF AROMATIC/ALIPHATIC COPOLYAMIDES FROM LACTAM-PLASTICIZED POLYMER

BACKGROUND OF THE INVENTION

In copending and coassigned, U.S. patent application Ser. No. 07/402,295, now abandoned there is disclosed a process for preparing melt-processible polyamides consisting essentially of the following repeat units:

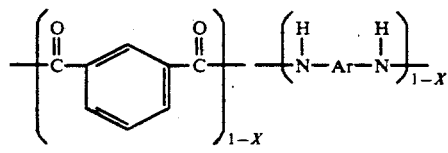

and

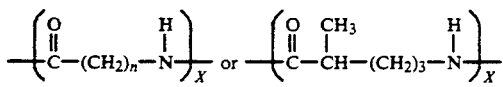

wherein n is 4 or 5; X is from 0.01 to 0.50, preferably 0.02 to 0.30; and Ar is selected from certain divalent aromatic radicals. As prepared by the method disclosed in said application, the polyamides are plasticized with a lactam of the group of caprolactam, valerolactam and 3-methylvalerolactam. Generally, it is desirable that the polymer be freed from the lactam prior to melt-extrusion. Recovery of the polymer from the lactam plasticized admixture presents certain problems because of the affinity of the lactam for the polymer. The present invention provides a procedure for accomplishing this objective.

SUMMARY OF THE INVENTION

This invention provides a process comprising dissolving a lactam-plasticized polyamide consisting essentially of the following repeat units:

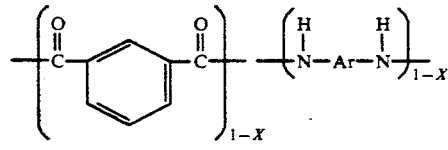

and

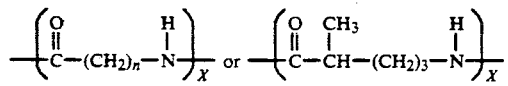

wherein n is 4 or 5; X is from 0.01 to 0.50, preferably 0.02 to 0.30; and Ar is at least one divalent aromatic radical of the group consisting of 1,3-phenylene, 1-methyl-2,4-phenylene, 1-ethyl-2,4-phenylene, 3,4'-oxydiphenylene, 1,3-bis(3-phenyleneoxy) benzene and 1,4-bis(4-phenyleneoxy)-2-phenylbenzene or a mixture of members of said group with minor amounts of 1,4-phenylene or 4,4'-oxydiphenylene radicals, and wherein the lactam is selected from caprolactam, valerolactam and 3-methylvalerolactam, in a solvent selected from the group consisting of dimethylacetamide (DMAc), N-methylpyrrolidone (NMP), dimethyl sulfoxide (DMSO) and N,N'-dimethylpropyleneurea (DMPU); introducing the solution into water with agitation to insure distribution and to cause precipitation of the polymer in particulate form; separating the precipitated polymer from the liquid; melting the polymer and extruding it through an orifice to form a shaped structure substantially free of lactam.

DETAILED DESCRIPTION OF THE INVENTION

In accordance with the present invention, the lactam-plasticized aromatic/aliphatic copolyamide prepared in accordance with the procedures of copending and coassigned U.S. application Ser. No. 07/402,295, now abandoned, is first dissolved in a suitable solvent. As noted in said application, the lactams present as plasticizers in the as-prepared aromatic/aliphatic copolyamides are caprolactam, valerolactam or 3-methyl-valerolactam. Useful solvents include DMAc, NMP, DMSO and DMPU.

In order to effectively remove substantially all of the lactam (some small amounts, e.g. <2%, and preferably <0.05% may remain), it is important that the concentration of the solution not exceed 25% by wt. It is preferred that the concentration be at least 5% for reasons of economy. From 10-20% concentration is most preferred. Dissolution of the lactam occurs concomitantly with the polymer.

The next step is to precipitate the polymer from the solution leaving the lactam dissolved in the solvent. Since the lactam has an affinity for the polymer it is desirable to avoid highly concentrated solutions of the polymer in the solvent and to mix the solution thoroughly with the coagulant, i.e., water, to assure that the precipitated polymer contains the least amount of lactam. It is important that vigorous mixing take place, such as with a Waring blender, when the polymer solution is combined with the water coagulant. Failure to do so may result in the formation of the polymer chunks having a skin on the outside that presents lactam from diffusing into the water. Practice of this process has resulted in polymer having a lactam content of less than 0.5%.

The precipitated polymer which may be in the form of particles such as powders, fibrids etc. is then separated from the liquid by filtration or other techniques. The polymer is then melted and shaped by extrusion through an orifice. If desired, the precipitated polymer may be formed into a plug by heat and pressure and then melt-extruded. The following examples are presented to illustrate the present invention and are not to be construed as limiting.

EXAMPLE 1

Into a large glass polymer tube was placed 40.05 g (0.2 mol) of 3,4'-diaminodiphenyl ether (3,4'-DDE) and 65.81 g (0.2004 mol, 1.002 equiv.) of N,N'-isophthaloyl bis-valerolactam (IBV) with 1.3 microequivalents (meq.) of carboxyl per g. The tube was sealed with a vacuum distillation apparatus and a down-pumping stainless steel helical stirrer. The reactor was purged thoroughly by cycling between vacuum and nitrogen, and put under a vacuum of 70 mm of mercury. The tube was immersed in a Wood's metal bath set at 250° C. and stirring was started at low speed. A quantity of 16 mL (17 g, 43%) valerolactam was vacuum distilled from the initial melt. The copolymer was stirred for 1.5 hours until the stirrer halted as it became very viscous. The copolymer was then held for 2.5 hours at the same temperature and pressure. The stirrer was slowly removed at the end of the run, so that the copolymer could drain into a plug. The reactor was removed from the bath, cooled to room temperature, and immersed in dry ice to shatter the tube to collect the plug.

The plug was cut into pieces and dissolved in 700 mL hot dimethylacetamide (DMAc) with stirring. The solution was filtered, poured into water in a Waring blender, and mixed well. The particulate polymer precipitate was filtered, soaked overnight in water, and refiltered. The damp particles were stirred with water, filtered, stirred with methanol, filtered and dried overnight in a 90° C. vacuum oven with a nitrogen purge.

The extracted copolymer had an inherent viscosity of 1.26 and a $T_g$ of 236.37° C. It proton NMR spectrum showed that the copolymer was free of valerolactam and contained 2.35 wt. % (7.41 mol %) of —C(=O)—(CH$_2$)$_4$—NH— repeat units in the copolymer chain. Analysis of the extracted copolymer by gas chromatography confirmed the absence of valerolactam. A small plug (5-10 g) of the lactam-free copolymer was melt spun at 335° C., using a one-hole spinneret. The as-spun monofilament of 41.4 dtex (37.6 denier) had a tenacity of 3.01 g/dtex (3.31 gpd), its elongation was 127%, and its modulus was 27.3 g/dtex (30.0 gpd). Upon drawing 1.7× at 200° C., the 22.0 dtex (20.0 denier) monofilament had a tenacity of 3.8 g/dtex (4.18 gpd), its elongation was 11.4%, and its modulus was 61.9 g/dtex (68.1 gpd). Upon drawing 2.5× at 220° C. the 15.1 dtex (13.6 denier) monofilament had a tenacity of 4.23 g/dtex (4.65 gpd), its elongation was 22.5%, and its modulus was 52.0 g/dtex (57.2 gpd).

EXAMPLE 2

In this example a mixture of aromatic diamines, m-phenylenediamine (MPD) and p-phenylenediamine (PPD), is reacted with N,N'-isophthaloyl bis-caprolactam (IBC) to form a copolymer plasticized with residual caprolactam, and the residual caprolactam is extracted from the copolymer by dissolving the copolymer in various solvents and then converting it into a solid in powder form by precipitating it with agitated water.

Into a two-liter resin kettle fitted with a stirrer and heating mantle was placed a mixture of IBC (862.5 g, 2.4 mol), MPD (183.2 g, 1.7 mol), and PPD (78.5 g, 0.73 mol). The mixture was maintained under a continuous nitrogen flow at a temperature between 250° C. and 260° C. for four hours. The product was a clear amber plasticized copolymer in solution with 34.3% caprolactam by weight.

A sample of 2.74 g of the plasticized copolymer was dissolved, with heating, in 52.06 g of DMAc and the solution was precipitated by pouring it slowly into a Waring blender containing 250 mL of water agitated by the blender. The product formed was a powder, which was filtered and washed with about 500 mL of water and dried in a 110° C vacuum oven. The isolated copolymer contained 0.71 wt. % caprolactam, as determined by analysis of a sample of the copolymer on a gas chromatograph (Hewlett-Packard 5890 gas chromatograph, available from Hewlett-Packard Co., Route 41, Avondale, Pa., 19311).

Another sample of 2.22 g of the plasticized copolymer was dissolved, with heating, in 8.88 g of DMPU and the solution was precipitated as above by pouring it into 250 mL of water agitated by the Waring blender at the same power setting, rinsing, and drying. The isolated copolymer contained 0.11 wt. % caprolactam, as determined by analysis of a sample of the copolymer on the gas chromatograph.

Similarly, 2.33 g of the plasticized copolymer was dissolved in 9.32 g of NMP, with heating, and the solution was precipitated as above by pouring it into 250 mL of water agitated by the Waring blender at the same power setting, rinsing, and drying. The isolated copolymer contained 0.57 wt. % caprolactam, as determined by analysis of a sample of the copolymer on the gas chromatograph.

A further sample of 2.75 g of the plasticized copolymer was dissolved in 11.00 g of DMSO, with heating, and the solution was precipitated as above by pouring it into 250 mL of water agitated by the Waring blender at the same power setting, rinsing, and drying. The isolated copolymer contained 2.1 wt. % caprolactam, as determined by analysis of a sample of the copolymer on the gas chromatograph.

EXAMPLE 3

Following the general procedure of Example 2 of Singh in his U.S. patent application Ser. No. 07/402,295, IBC and 3,4'-diaminodiphenyl ether (3,4'-DDE) are reacted to form a copolymer plasticized with residual caprolactam. A quantity of 25 g of the plasticized copolymer, which had an inherent viscosity of 0.59 and contained 27 wt. % of free caprolactam, was dissolved in 200 mL of DMAc by warming the mixture on a hot plate while stirring. A clear solution formed readily. The copolymer was recovered by adding it slowly to 250 g of ice water in a Waring blender, producing a white powder in the mixture. The suspension was filtered and the solid washed in the funnel with water until the filtrate was clear of foam, using about two liters of water wash.

The weight of copolymer recovered was 16.7 g (92% of theory), and the caprolactam content was measured as 0.82 wt. % by gas chromatography. The copolymer may be melt-pressed into a plug and melt-spun as in Example 1.

We claim:

1. A process for the recovery and melt-extrusion of aromatic/aliphatic copolyamides from lactam-plasticized polymer comprising dissolving a lactam-plasticized polyamide consisting essentially of the following repeat units:

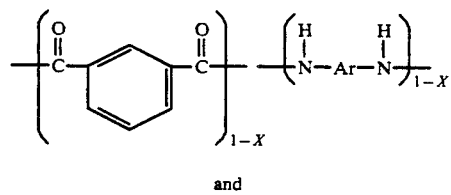

and

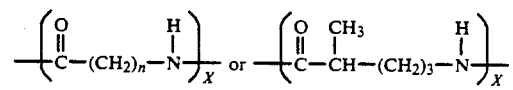

wherein n is 4 or 5; X is from 0.01 to 0.50, preferably 0.02 to 0.30; and Ar is at least one divalent aromatic radical of the group consisting of 1,3-phenylene, 1-methyl-2,4-phenylene, 1-ethyl-2,4-phenylene, 3,4'-oxydiphenylene, 1,3-bis(3-phenyleneoxy) benzene and 1,4-bis(4-phenyleneoxy)-2-phenylbenzene or a mixture of members of said group with minor amounts of 1,4-phenylene of 4,4'-oxydiphenylene radicals, and wherein the lactam is selected from caprolactam, valerolactam and 3-methylvalerolactam, in a solvent of the group consisting of dimethylacetamide, N-methylpyrrolidone, dimethyl sulfoxide and N,N'-dimethylpropyleneurea; introducing the solution into water with agitation, separating the precipitated polymer from the liquid; melting the polymer and extruding it through an orifice to form a shaped structure substantially free of lactam.

2. The process of claim 1 wherein the polymer concentration in the solution is from 5 to 25% by weight.

3. The process of claim 2 wherein the polymer concentration in the solution is from 10 to 20% by weight.

4. The process of claim 1 wherein the solvent is dimethylacetamide.

5. The process of claim 1 wherein the solvent is N,N'-dimethylpropyleneurea.

6. The process of claim 1 wherein the polymer is formed from 3,4'-diaminodiphenyl ether and N,N'-isophthaloyl bis-valerolactam.

* * * * *